United States Patent
Chesnokov (10) Patent No.: US 10,491,924 B2
(45) Date of Patent: Nov. 26, 2019

(54) ENCODING AND DECODING OF IMAGE DATA

(71) Applicant: Apical Ltd, Cambridge (GB)

(72) Inventor: Viacheslav Chesnokov, Loughborough (GB)

(73) Assignee: Apical Limited, Cambridge (GB)

( * ) Notice: Subject to any disclaimer, the term of this patent is extended or adjusted under 35 U.S.C. 154(b) by 83 days.

(21) Appl. No.: 15/834,986

(22) Filed: Dec. 7, 2017

(65) Prior Publication Data

US 2018/0176604 A1 Jun. 21, 2018

(30) Foreign Application Priority Data

Dec. 21, 2016 (GB) .................................... 1621898

(51) Int. Cl.
*H04N 19/90* (2014.01)
*H04N 19/176* (2014.01)
*H04N 19/36* (2014.01)
*H04N 19/82* (2014.01)

(52) U.S. Cl.
CPC .......... *H04N 19/90* (2014.11); *H04N 19/176* (2014.11); *H04N 19/36* (2014.11); *H04N 19/82* (2014.11)

(58) Field of Classification Search
CPC ...... H04N 19/90; H04N 19/176; H04N 19/36; H04N 19/82
USPC ....................................................... 382/233
See application file for complete search history.

(56) References Cited

U.S. PATENT DOCUMENTS

| 2010/0238190 | A1  | 9/2010 | Ciurea et al. |
| 2014/0247890 | A1* | 9/2014 | Yamaguchi .......... H04N 19/172 375/240.29 |

OTHER PUBLICATIONS

Combined Search and Examination Report dated Jun. 20, 2017 for Application No. GB1621898.4.

* cited by examiner

*Primary Examiner* — Leon Flores
(74) *Attorney, Agent, or Firm* — EIP US LLP (57) ABSTRACT

A method of encoding image data representing an image is provided. The method includes receiving the image data. The method includes applying a lossy encoding operation to the image data to generate encoded image data representing the image. The method includes decoding the encoded image data to generate decoded image data. The method includes reducing a compression-noise component of the decoded image data to generate reduced-noise decoded image data. The method includes processing the reduced-noise decoded image data and the image data to generate difference data representing a difference between the image data and the reduced-noise decoded image data. The method includes encoding the difference data to generate encoded difference data. A method of decoding image data derived, using a lossy encoding operation, from image data representing an image is also provided. A computing device is also provided.

20 Claims, 7 Drawing Sheets

ENCODING AND DECODING OF IMAGE DATA

CROSS-REFERENCE TO RELATED APPLICATIONS

This application claims priority to GB Application No. GB 1621898.4, filed Dec. 21, 2016, under 35 U.S.C. § 119(a). The above-referenced patent application is incorporated by reference in its entirety.

BACKGROUND

High dynamic range (HDR), high precision image and video content is now widely available. For example, digital cameras providing 12- or 14-bit HDR images are available. The JPEG committee is in the process of developing a new coding standard called JPEG XT (ISO/IEC 18477), which aims to provide both HDR image coding and backwards compatibility with standard JPEG (Joint Photographic Experts Group, ISO/IEC 10918) compression.

HDR data may be encoded using a JPEG XT encoder, to encode the data into base image layer data and extension image layer data. The base image layer data may be LDR (low dynamic range, sometimes referred to as SDR or standard dynamic range) data accessible to legacy implementations so that the JPEG XT encoded image can be decoded using a standard JPEG decoder, which can decode the LDR or SDR data and ignore the extension image layer data. The extension image layer data may be used for reconstructing an HDR image. To decode the JPEG XT encoded image, it is necessary to transfer both the encoded base image layer data and extension image layer data to a JPEG XT decoder for decoding.

It is desirable to provide a more efficient encoding method, for example for encoding HDR images. For example, it is desirable to provide an encoding method with reduced data transfer requirements for transfer of data between an encoder and a decoder. It is similarly desirable to provide a more efficient decoding method.

SUMMARY

The present disclosure relates to a method of encoding image data, a method of decoding encoded image data and a computing device for encoding, decoding or both encoding and decoding image data.

According to some aspects, a method of encoding image data representing an image is provided. The method includes receiving the image data. The method includes applying a lossy encoding operation to the image data to generate encoded image data representing the image. The method includes decoding the encoded image data to generate decoded image data. The method includes reducing a compression-noise component of the decoded image data to generate reduced-noise decoded image data. The method includes processing the reduced-noise decoded image data and the image data to generate difference data representing a difference between the image data and the reduced-noise decoded image data. The method includes encoding the difference data to generate encoded difference data.

According to some other aspects, a method of decoding encoded image data derived, using a lossy encoding operation, from image data representing an image is provided. The method includes receiving the encoded image data. The method includes decoding the encoded image data to generate decoded image data. The method includes applying a compression-noise reduction operation to reduce a compression-noise component of the decoded image data to generate reduced-noise decoded image data. The method includes receiving encoded difference data. The method includes decoding the encoded difference data to generate decoded difference data representing a difference between the image data and the reduced-noise decoded image data. The method includes processing the reduced-noise decoded image data and the decoded difference data to generate output image data representing the image.

According to some other aspects, a computing device is provided. The computing device includes storage for storing encoded image data derived, using a lossy encoding operation, from image data representing an image, and encoded difference data. The computing device includes at least one processor communicatively coupled to the storage. The computing device includes a decoder module operable to decode the encoded image data to generate decoded image data. The decoder module is operable to apply a compression-noise reduction operation to reduce a compression-noise component of the decoded image data to generate reduced-noise decoded image data. The decoder module is operable to decode the encoded difference data to generate decoded difference data representing a difference between the image data and the reduced-noise decoded image data. The decoder module is operable to process the reduced-noise decoded image data and the decoded difference data to generate output image data representing the image.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Details of the method according to examples will become apparent from the following description, with reference to the figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of encoding image data representing an image. The method includes receiving the image data, applying a lossy encoding operation to the image data to generate encoded image data representing the image and decoding the encoded image data to generate decoded image data. A compression-noise component of the decoded image data is reduced to generate reduced-noise decoded image data. The reduced-noise decoded image data and the image data are processed to generate difference data representing a difference between the image data and the reduced-noise decoded image data, and the difference data is encoded to generate encoded difference data.

By reducing a compression-noise component of the decoded image data, visible compression artefacts in the image may be reduced. For example, the reduced-noise image data may represent an image that is more visually similar to the input image than the decoded image data prior to compression-noise reduction. The difference between the image data and the reduced-noise decoded image data may therefore be smaller than without compression-noise reduction, which may allow the difference data representing the difference to be more efficiently encoded. Furthermore, the difference data, and therefore the encoded difference data, may require a smaller amount of memory for storage than without the compression-noise reduction. Accordingly, the amount of encoded data to be sent to a decoder for decoding, which includes the encoded image data and the encoded difference data, may be reduced compared with a known JPEG XT codec.

Figure 1:
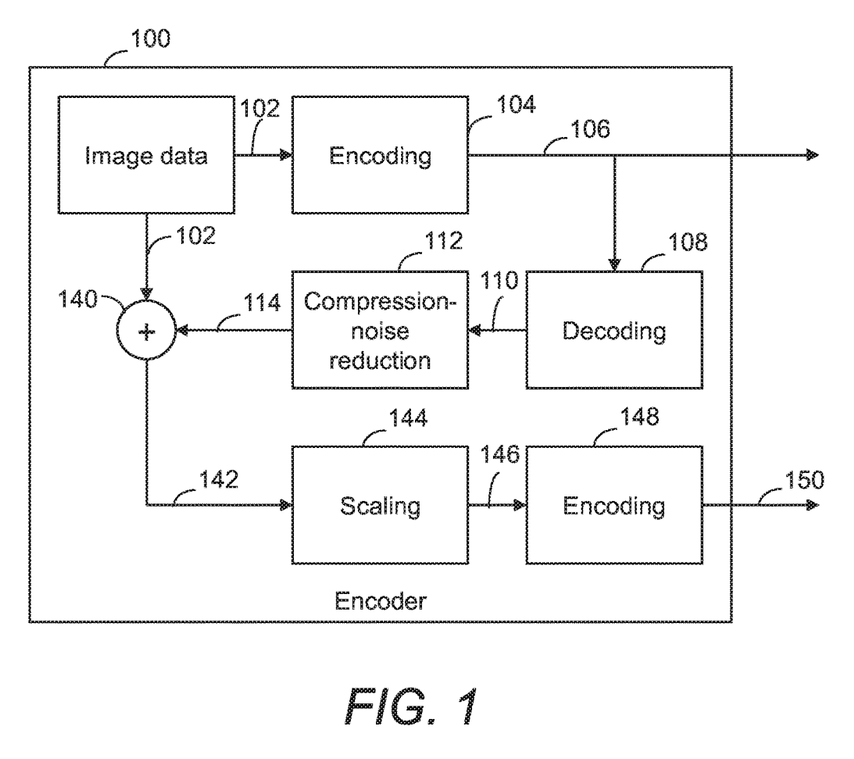
FIG. 1 is a schematic diagram showing an example of internal components of a decoder for carrying out a method of encoding image data according to examples.

Internal components of an example encoder 100 for use with a method of encoding image data according to examples described herein are illustrated schematically in FIG. 1. The encoder 100 of FIG. 1 is arranged to receive image data 102. The image data 102 represents an image, which may be the entire or whole image or a portion, part or subset of a larger image. The image is for example an image from a web page accessed by a browser of a computing device, such as a browser of a smartphone; an image captured by an image capture device, such as a camera, of the computing device; or an image downloaded to or stored in storage of the computing device. The image may include any graphical or visual content, for example text, graphics, pictures, and/or photographs. The image may be a still image or a moving image. For example, the image data may be video image data.

The image data may include the intensity values of each pixel of the image, which may be stored with a greyscale or brightness level of, for example, from 0 to 255 per color band for 8-bit data. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. The image data may also include color data, relating to the color of the image represented by the image data. For example, when the image is a color image, a pixel value of an intensity or brightness or each pixel may be stored separately for each color channel. If a pixel is represented by, for example, three primary colors such as in the RGB (red, green, blue) or YUV color spaces (where Y represents the luma of the color, U represents the difference between the blue component of the color and the luma and V represents the difference between the red component of the color and the luma), the visual appearance of each pixel may be represented by three intensity values, one for each primary color, for example with a bit precision of 8 bits per color channel. As will be appreciated by the skilled person, the image data may represent the image using any suitable representation, which may be different from the examples set out above, which are merely illustrative.

The image data 102 may be in any suitable format for representing images. In examples, the image data 102 is in a more than 8-bit format such as a higher than 8-bit floating point format. The image data 102 may, for example, be in an HDR (high dynamic range) format such as the JPEG XT format.

Where the image data 102 is in an HDR format, a dynamic range of the image data 102 may be reduced (not shown) before the image data is encoded. By reducing the dynamic range of the image data 102, the image data 102 can be converted from HDR data to SDR data. In this way, a bit precision of the image data 102 can be reduced, for example from a higher than 8-bit precision to an 8-bit precision.

A tone mapping operation may be applied to the image data 102 to reduce the dynamic range of the image data 102. Such a tone mapping operation may enhance detail or contrast in the image, while still ensuring the image appears relatively "natural" to an observer. To do this, the tone mapping may be asymmetric in the brightness domain, such that a greater amount of tone mapping is applied to dark regions of the image than relatively bright regions, for example by altering an intensity value of relatively dark portions of the image to a greater extent than relatively bright portions. This mimics the behavior of the human eye, which has a relatively high dynamic range, and which is capable of seeing detail in even relatively dark regions of an image. The tone mapping operation may therefore be spatially-variant, for example spatially non-uniform, with a greater amount of tone mapping applied to certain spatial regions of the image, such as dark regions, compared with other spatial regions, such as light regions. The tone mapping may be continuous and smoothly-varying in both spatial and luminance dimensions. The intensity range of pixels corresponding with detail to preserve in the image in dark and/or light areas may therefore be increased and the intensity range of other areas of the image may be decreased. The tone mapping may therefore be used to adjust, for example reduce, the dynamic range of the image, which in examples is the ratio between intensities of the brightest and darkest parts of the image. Reducing the dynamic range in this way typically enhances detail in dark and/or light areas of the image and reduces detail in mid-tone areas so as to render visible detail that would otherwise be lost in bright or shaded areas of the image while still maintaining a natural look of the image to the observer. Various different tone mapping algorithms may be used for the tone mapping operation. For example, a suitable algorithm is the Orthogonal Retina-Morphic Image Transform (ORMIT) algorithm.

In other examples, however, the dynamic range reduction step may be omitted.

Referring to FIG. 1, the image data 102 is then encoded 104 using a lossy encoding operation, such as the JPEG encoding operation, to generate encoded image data 106, which may be in an 8-bit format, although other bit precisions are possible.

In the example of FIG. 1, the encoded image data 106 is then decoded 108 to generate decoded image data 110. As the encoded image data 106 has been encoded 104 using a lossy encoding operation, the decoded image data 110 and the image data 102 prior to encoding 104 are typically not identical due to the loss of information during the lossy encoding operation. A lossy encoding algorithm such as the JPEG encoding algorithm typically involves an approximation of the original image data, with some reduction in image fidelity. For example, some original image information may be lost. It may not be possible to recover this lost information, which can reduce the image quality compared with the image quality of the original image.

For example, the lossy encoding operation may have introduced compression-noise into the image represented by the decoded image data 110, for example such that there is a compression-noise component of the decoded image data. The compression-noise component of the decoded image data typically represents the compression-noise present in the decoded image data, for example the magnitude, amount or level of compression-noise. For example, there may be noise, such as pixels with an incorrect (for example noticeably darker or lighter) intensity, around features of the image such as edges or regions corresponding to a transition from a light to a dark image region. There may also or instead be visible "blocks" of pixels with the same intensity around such image features, rather than pixels with smoothly varying intensities. Compression artefacts such as these are typically caused by the quantization step of the lossy encoding operation, which involves rounding of various components to integer values, thereby reducing the information associated with the quantized, encoded image data. The visibility of such compression artefacts may depend on the extent or amount of compression applied to the original image data to obtain the compressed image data.

Methods such as those implemented by the encoder 100 of FIG. 1 may include reducing a compression-noise component 112 of the decoded image data 110 to generate reduced-noise decoded image data 114. The decoded image data may be in the form of a matrix or other multi-dimensional data structure. The decoded image data may be convolved with a suitable filter, which is typically also in the form of a matrix or multi-dimensional data structure and which may be referred to as a kernel, a convolution matrix or a mask, to reduce the compression-noise component. For example, the reducing the compression-noise component of the decoded image may include applying a kernel to decoded image data representing a first portion of the image. The first portion may be a part of the image, such as a part suffering from compression-noise, or the whole image.

By applying a suitable filter to the decoded image data, compression artifacts in the decoded image data may be smoothed out. Such a filter may therefore be used to reduce compression artefacts such as blockiness, e.g. visible blocks, or ringing, e.g. visible rings, in images. In examples, a bilateral filter and/or an anisotropic filter may be applied to the decoded image data, for example to reduce blockiness, ringing or both of these artefacts.

A bilateral filter is non-linear and aims to preserve edges in the image while reducing noise. Typically, applying a bilateral filter to image data involves replacing an intensity value at each pixel of an image represented by the image data with a weighted average of intensity values of nearby pixels. The weights may be based on a Gaussian distribution, depending on at least the distance between pixels and differences in color or greyscale characteristics such as color intensity differences.

An anisotropic filter aims to enhance textures in an image that are for example angled with respect to an axis of the image, such as a central or viewing axis, by reducing noise while preserving detail in the image.

A combination of one or more compression-noise reduction filters may be used to reduce the compression-noise component of the decoded image data. For example, the reducing the compression-noise component of the decoded image data may include applying one of, or a combination of any two or more of: a smoothing filter to the decoded image data to reduce banding noise in the decoded image data, a bilateral filter to the decoded image data, an anisotropic filter to the decoded image data, a sliding window filter to the decoded image data or an averaging filter to the decoded image data, in combination with any other suitable filters.

For example, a smoothing filter may be or include an edge detection filter such as a Canny edge detector, which may be applied to the decoded image data to identify points or regions in the image at which the image brightness or pixel intensity changes rapidly or sharply. Such points or regions typically correspond with edges in the image, for example transitions between different surfaces or components within the image. Depending on the proximity to the identified edge regions, the pixel intensity values can be adjusted, for example smoothed, to reduce compression-noise in the image represented by the decoded image data. For example, an averaging filter may be applied to the decoded image data to average pixel intensities over a set of adjacent or nearby pixels for pixels in regions that are identified as being within or beyond a pre-determined proximity to a detected edge. For example, the first portion of the image to which a kernel, such as a smoothing filter or averaging filter, is applied may be a region of the image which is substantially free from edges. Compression artefacts may be particularly visible in such a region, which is for example a smooth or substantially unvarying image region. Thus, in examples, the compression-noise component is reduced for these regions.

In such cases, portions of the image including an edge may not have their compression-noise reduced, for example to avoid undesirable blurring of the edges due to the compression-noise reduction. Alternatively, a compression-noise component of portions of the image including edges may be reduced using a different filter or using a kernel of a different size than the kernel applied to the first portion.

As noted above, in examples, the reducing the compression-noise component of the decoded image data may include applying a smoothing filter to reduce banding noise in the decoded image data. Banding noise is a type of compression-noise that may be caused by the quantization step of a lossy encoding operation, such as the JPEG encoding algorithm. For example, during this quantization process, there may be a few image regions in an image in which pixel intensities change by a relatively small amount. For example, in an image of the sky with a lighter region and a darker region, the lighter region and the darker region may each show relatively little change in pixel intensity and/or color. In this illustrative example, the pixels corresponding to the lighter region in the image may be compressed to a first pixel intensity and color value, and the pixels corresponding to the darker region in the image may be compressed to a second pixel intensity and color value. This may lead to a visible band or contour in which all the pixels of the lighter region have the same pixel intensity and color value, which contrasts strongly with a neighboring band or contour of pixels of the darker region, for example if further processing, such as tone mapping, is applied to the image.

By applying a smoothing filter such as a low-pass filter with a suitable kernel, which for example governs how a pixel's filtered intensity value depends on the intensity value of neighboring pixels, the banding noise can be reduced. For example, the smoothing filter may reduce a sharpness in contrast between image regions of different intensities or colors, for example by blurring, spreading or gradually adjusting the pixel intensity in a transition region between the different image regions. For example, a simple low-pass filter can be used to calculate the average intensity of a pixel and the 8 immediate neighbors of the pixel, and replacing the original intensity value of the pixel with this calculated average intensity value.

One or more compression-noise reduction filters may be applied using a graphics processing unit of a computing device in examples. This can allow parallel processing or computation of convolutions of the one or more compression-noise reduction filters with various groups or regions of pixels of an image. This can improve the speed of performing the compression-noise reduction.

The extent to which the compression-noise in the image is reduced by the one or more compression-noise reduction filters may depend on a quality factor. For example, the quality factor may be received as an input to the one or more compression-noise reduction filters. The quality factor may be selected by a user depending on a desired visual impression for the image or the quality factor may depend on user-independent characteristics such as the content of the image or settings associated with the image, for example provided by the content creator. For example, if the image has been obtained using a high-quality image sensor, which is capable of capturing images with low sensor noise, then most of the noise is likely to be compression-noise. In such cases, the compression-noise may be reduced to a greater extent than in other examples in which the image has been obtained with a low-quality image sensor suffering from high sensor noise, in which most of the noise is likely to be sensor noise.

Figure 2:
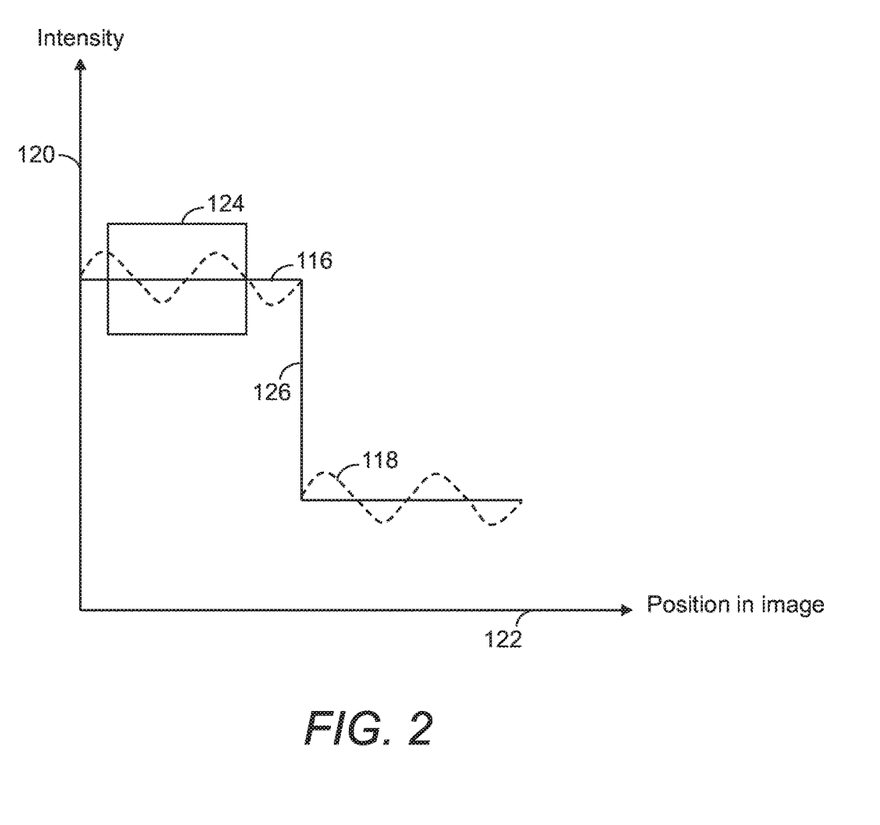
FIG. 2 is a graph illustrating schematically an example of use of a sliding window filter for reducing a compression-noise component in an image.

As described above, in examples a sliding window filter may be applied to the decoded image data to reduce a compression-noise component of the decoded image data. FIG. 2 is a graph illustrating schematically an example of use of a sliding window filter. The intensity values of a row of pixels in an image are shown in FIG. 2 for an image prior to encoding 116 and for the image after encoding and decoding 118. The y-axis 120 of FIG. 2 corresponds with intensity and the x-axis 122 corresponds with pixel position in the image. As can be seen in FIG. 2, there is a difference between the pixel intensity values in the image after encoding and decoding 118 compared with the pixel intensity values prior to encoding 116. This difference is for example due to compression-noise from the encoding and decoding process.

FIG. 2 also shows schematically a sliding window filter 124. The sliding window filter 124 is moved to various different positions in the image (in this example, by "sliding" or moving the sliding window filter 124 across or along the pixels in the row of pixels) and convolved with different pixels accordingly, to reduce a compression-noise of the image.

In the example of FIG. 2, the row of pixels has a sharp transition 126 in intensity value. This transition for example corresponds with an edge in the image. In examples, the kernel or filter convolved with the image may be convolved with an image solely in regions of the image that do not include sharp features or edges, for example to avoid reducing the sharpness of such features. For example, the sliding window filter 124 may be moved to various positions in the image, provided that these positions are more than a certain minimum distance from an edge in the image.

In other cases, the kernel, such as the sliding window filter 124, may be a first kernel with a first size and the reducing the compression-noise component of the decoded image data may also include applying a second kernel with a second size, different from the first size, to decoded image data representing a second portion of the image. Where the second portion of the image is closer to an edge in the image than the first portion of the image, the second size may be smaller than the first size. In this way, a relatively large kernel may be used away from edges to smooth image regions away from sharp image features and a smaller kernel may be used closer to edge regions, for example to help preserve sharp edges and avoid or reduce blurring of such edges.

Figure 3A:
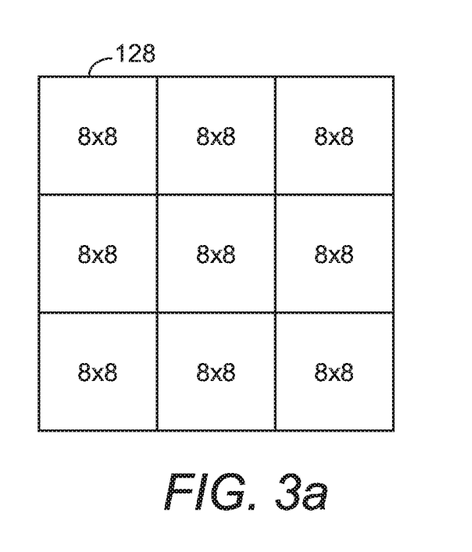
FIG. 3*a* is a schematic illustration of an example image and FIG. 3*b* is a schematic illustration of the image data associated with the example image.
Figure 3B:
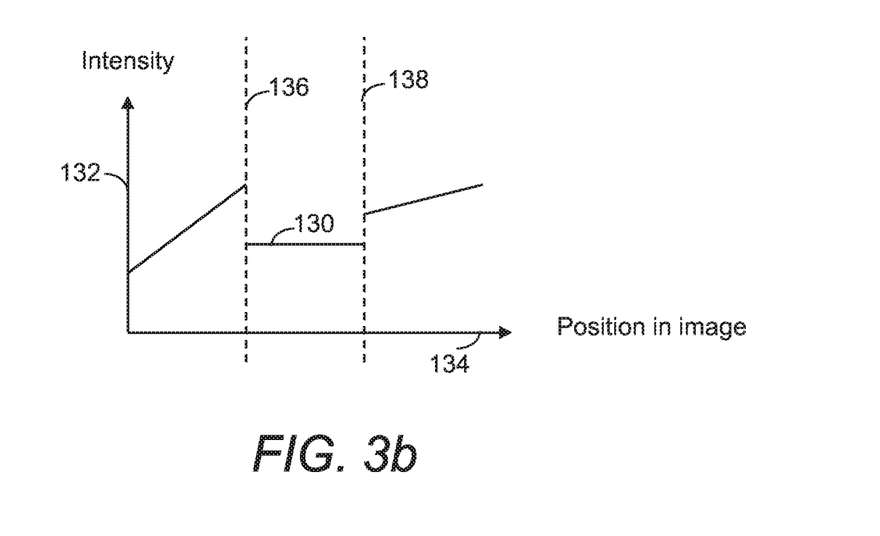

FIGS. 3*a* and 3*b* illustrate an example origin of compression-noise in encoded image data. In examples such as FIGS. 3*a* and 3*b*, the lossy encoding operation includes dividing the image 128 into a plurality of blocks, which in this example are blocks of 8 by 8 pixels although other block sizes are possible. Blockiness is expected to occur at the boundaries between neighboring blocks because of discontinuities in pixel intensity values as a consequence of quantization step of the lossy encoding operation. This can be seen clearly in the graph of FIG. 3*b*, which shows the pixel intensity values 130 of the image after encoding and decoding, and in which the y-axis 132 corresponds with intensity and the x-axis 134 corresponds with pixel position in the image. The pixel intensity values 130 are discontinuous along the boundaries between neighboring blocks of pixels, with a first discontinuity at a first boundary 136 between the left column of blocks and the middle column of blocks and a second discontinuity at a second boundary 138 between the middle column of blocks and the right column of blocks.

To improve compression-noise reduction in examples such as FIGS. 3*a* and 3*b*, a kernel may be applied to decoded image data representing a first portion of the image comprising a boundary between neighboring blocks of the plurality of blocks of the image. For example, referring to FIG. 3*a*, the kernel may be applied to a first portion of the image including the pixels surrounding the first boundary 136 or the second boundary 138, as these portions of the image may be particularly susceptible to compression-noise.

Referring back to FIG. 1, after the compression-noise component of the decoded image data 110 is reduced 112 to generate the reduced-noise decoded image data 114, the reduced-noise decoded image data 114 and the image data 102 are processed 140 to generate difference data 142 representing a difference between the image data 102 and the reduced-noise decoded image data 114. The difference data 142 may be in an 8-bit format, for example to reduce storage requirements for storing the difference data 142. The difference data 142 may for example be obtained by a simple subtraction of the reduced-noise decoded image data 114 from the image data 102, or vice versa. A subtraction like this may be performed by subtracting the pixel intensity values, which may be done separately for each color channel, for the image represented by the reduced-noise decoded image data 114 from the corresponding pixel intensity values for the image represented by the image data 102, on a pixel-by-pixel basis. However, in further examples, a different or more complex algorithm may be used to generate the difference data 142 from the reduced-noise decoded image data 114 and the image data 102. The difference data 142 may be considered to be a delta stream representing per-pixel differences or deltas based on a comparison of the reduced-noise decoded image data 114 and the image data 102.

In the example of FIG. 1, the difference data 142 is scaled 144 and the difference data after scaling 146 is encoded 148 to generate encoded difference data 150. The encoded difference data 150 is then typically transferred to a decoder and then decoded to obtain decoded difference data, as will be described further below with reference to FIG. 5. However, the encoding and decoding of the difference data 142 may cause the difference data itself to suffer from compression-noise. If the difference data 142 is small, the compression-noise component due to the encoding and decoding of the difference data 142 may be around the same level as the difference data 142 itself. For example, the magnitude of the difference data and the compression-noise component may be around 1% of the magnitude of the image data 102, where the magnitudes are for example pixel intensity magnitudes. This means that the difference data after encoding and decoding may be dominated by the compression-noise component, and may not accurately represent the difference data prior to encoding and decoding. By scaling the difference data 142 before encoding 148, as in the example of FIG. 1, the magnitude of the difference data 142 may be increased relative to the magnitude of the compression-noise component due to the encoding and decoding process. This can ensure that the difference data 142 remains relatively large compared to the compression-noise component even after encoding and decoding. For example, the difference data 142 may be scaled by a factor selected to render the compression-noise component negligible or sufficiently small to avoid adversely affecting the difference data.

Scaling the difference data 142 typically increases the size of the encoded difference data 150 relative to the size of the encoded image data 106, which can increase the bandwidth required to transmit the encoded difference data 150 and the encoded image data 106 from the encoder 100 to a decoder for decoding. For example, scaling the difference data 142 by a scaling factor of 4 or 8 may correspond to a requirement of an additional 2 or 3 bits of data, respectively, for storing the encoded difference data 150. Thus, the scaling factor may be selected to balance the increased accuracy with a larger scaling factor with the increased bandwidth required to transmit the encoded difference data 150. In this example, the scaling is a scaling by a factor of 4, although other scaling factors are possible as will be appreciated.

In other examples, though, the difference data 142 may be encoded without being scaled. In other words, the scaling step may be absent, for example in cases in which the magnitude of the difference data 142 is relatively large compared with the magnitude of the compression-noise component due to the encoding and decoding of the difference data 142 or where the bandwidth or storage requirements for storing the encoded difference data 150 are limited.

In examples such as that of FIG. 1, the encoding 148 the difference data includes applying the same lossy encoding operation to the difference data as applied to the image data 102 to generate the encoded image data 106. For example, the standard JPEG encoding algorithm may be used to encode each of the image data 102 and the difference data. However, in further examples, a different encoding operation may be applied to the difference data than to the image data. For example, a lossless encoding operation may be applied to the difference data.

Figure 4:
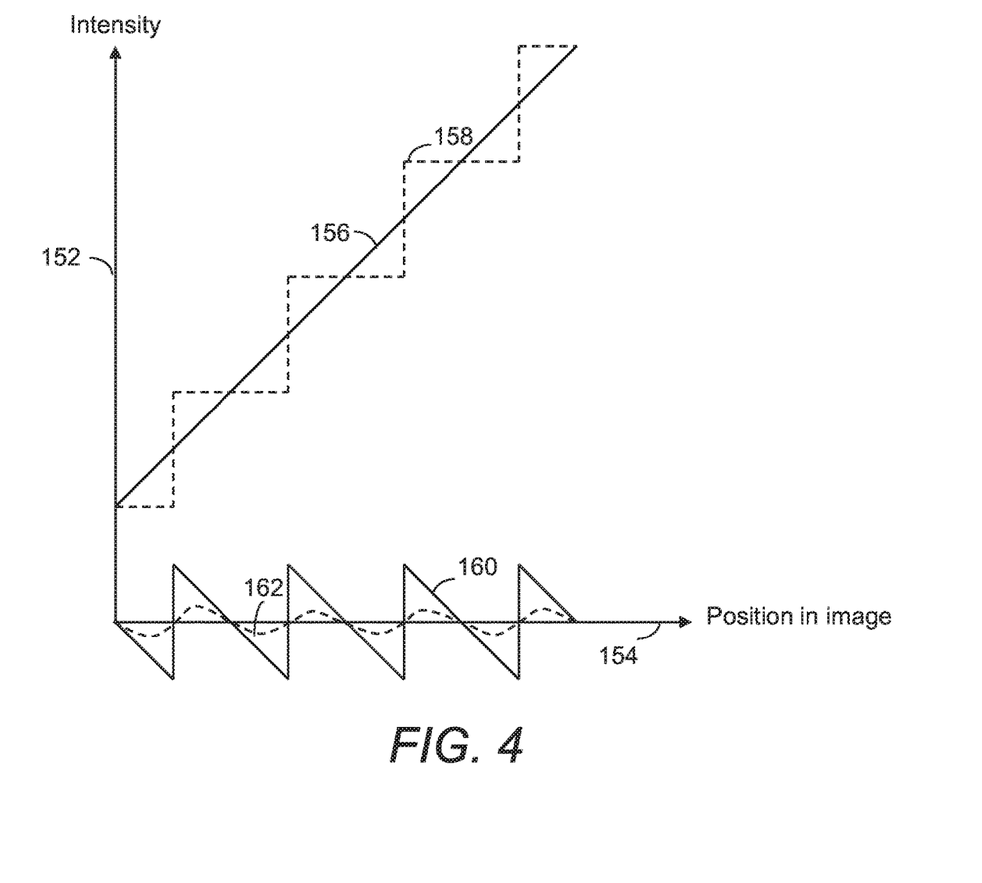
FIG. 4 is a graph illustrating, schematically, examples of image data and difference data.

FIG. 4 is a graph illustrating examples of image data and difference data. The y-axis 152 of FIG. 4 corresponds with intensity and the x-axis 154 corresponds with pixel position in the image. The pixel intensity value for a row of pixels in an example image prior to encoding is illustrated with a solid line 156 and the pixel intensity value for that same row of pixels in the example image after encoding and decoding is illustrated with a dashed line 158. Due to the quantization step in the lossy encoding algorithm, pixel intensity values for the image after encoding and decoding 158 differ from that of the image prior to encoding 156. This difference is illustrated at the bottom of the graph with a further solid line 160. However, after reducing the compression-noise component of the decoded image data, the difference between the reduced-noise decoded image data and the image data prior to encoding is smaller in magnitude than without the reduction in the compression-noise component. This difference is illustrated with a further dashed line 162 in FIG. 4. The magnitude of the difference data will depend on the content of the image; the difference data 162 of FIG. 4 is merely an example. For example, if there is fine detail in the image, such as fine detail in a human face in the image, and the compression-noise reduction smooths the image, the fine detail will be present in the difference data. The fine detail can therefore be reconstructed after decoding, by use of the difference data (as will be explained further below with reference to FIG. 5). Conversely, if the image is relatively smooth, such as an image of a monochromatic wall, and the compression-noise reduction smooths the image, the difference data will be substantially zero.

The difference data in examples is smaller in size than without the compression-noise reduction, allowing it to be stored and transmitted more efficiently. Accordingly, by generating the difference data in this way, the encoding and decoding process may be carried out more efficiently and with a smaller amount of data transferred from the encoder to the decoder.

Figure 5:
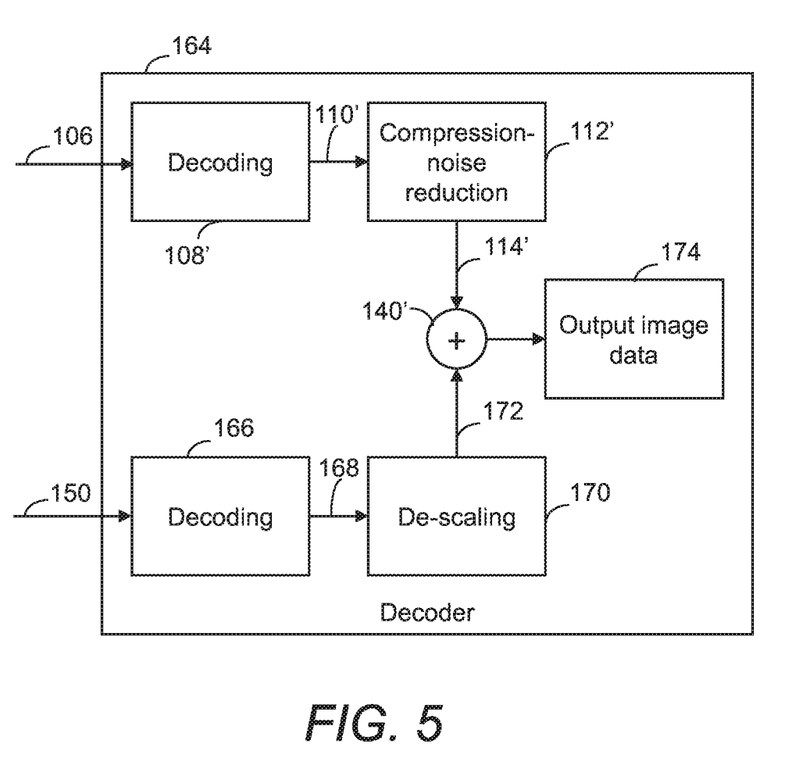
FIG. 5 is a schematic diagram showing an example of internal components of a decoder for carrying out a method of decoding encoded image data according to examples.

FIG. 5 is a schematic diagram showing an example of internal components of a decoder 164 for carrying out a method of decoding encoded image data according to examples. The decoder 164 in examples such as FIG. 5 has similar internal components to the example encoder 100 of FIG. 1, to allow the image to be accurately decoded. Components of the decoder 164 of FIG. 5 similar to corresponding components of the encoder 100 of FIG. 1 are labelled with the same reference numeral but with a dash; corresponding descriptions are to be taken to apply.

The decoder 164 receives encoded image data 106. The encoded image data 106 has been derived, using a lossy encoding operation, from image data representing an image. In this example, the encoded image data 106 has been encoded by the encoder 100 of FIG. 1 and is thus labelled with the same reference numeral. The encoded image data 106 is decoded 108' to generate decoded image data 110'. A compression-noise reduction operation 112' is applied to the decoded image data 110' to generate reduced-noise decoded image data 114'. The compression-noise reduction operation 112' of the decoder 164 is the same compression-noise reduction operation 112 as the encoder 100 in examples, to enable the image data 102 to be accurately decoded.

In parallel, encoded difference data 150 is received by the decoder 164. The encoded difference data 150 is the encoded difference data 150 encoded by the encoder 100 of FIG. 1 in this example. The encoded difference data 150 is decoded 166 to generate decoded difference data 168. The decoding of the encoded difference data 150 may use the same decoding algorithm as the decoding of the encoded image data 106' or a different algorithm. The decoded difference data 168 represents a difference between the image data 102 and the reduced-noise decoded image data 114'.

In the example of FIG. 5, the encoded difference data 150 is received from the encoder 100 of FIG. 1, which applies a scaling operation 144 to the difference data 142 before the difference data 142 is encoded 148. To reverse this scaling, the decoder 164 of FIG. 5 therefore includes a component arranged to apply a de-scaling operation 170 to the decoded difference data 168 to reverse the scaling that was previously applied. The de-scaling component may be absent in examples in which the difference data is not scaled during the encoding process. The decoded difference data after de-scaling 172 and the reduced-noise decoded image data 114' are processed 140' to generate output image data 174 representing the image. The output image data 174 may be substantially the same as the image data 102 for example in cases in which the compression-noise reduction reduces the compression-noise component to a sufficiently low level.

The decoded image data 110' may have a first bit precision, for example 8-bit, and the output image data 174 may have a second bit precision higher than the first bit precision, for example higher than 8-bit. For example, the processing of the reduced-noise decoded image data 114' and the difference data may be used to enhance the bit precision of the data representing the image. For example, the decoded image data 110' may represent a first dynamic range representation of the image, such as an SDR or LDR representation, and the output image data 174 may represent a second dynamic range representation of the image, such as an HDR representation, the second dynamic range being larger than the first dynamic range. Thus, the encoding and decoding process according to examples herein may be used to accurately replicate an HDR image, to compensate for compression-noise due to the encoding and decoding process such that the output image is also an HDR image.

In examples in which the encoder 100 of FIG. 1 and the decoder 164 of FIG. 5 are used to implement a JPEG XT codec, the encoded image data 106 may correspond with base image layer data, which may be LDR or SDR data accessible to legacy implementations so that the JPEG XT file can be decoded using a standard JPEG decoder, which can decode the LDR or SDR data and ignore the difference data. In this example, the encoded difference data 150 may correspond with extension image layer data, which includes residual image data and transformation information for reconstructing an HDR image, for example an image with a higher dynamic range than the image represented by the base image layer data. The encoded difference data may itself be decoded using a standard JPEG decoding algorithm and then combined with the decoded image data in accordance with the JPEG XT standard to generate the output image data representing the output image. For example, the decoding 108' of the encoded image data 104 and the decoding 166 of the encoded difference data 150 may both be performed using a standard JPEG decoder. In these examples, both the encoded image data 106 and the encoded difference data 150 may have a bit precision of 8-bits per color channel, for example 8-bit YUV, although other bit precisions are possible in other examples. As described above, the output image data 174 may have a higher than 8-bit precision per color channel.

An example system with which the method according to examples described above may be used will be described with reference to FIG. 6. As the skilled person will appreciate, however, other systems or apparatus may be used with or to implement the method. FIG. 7 illustrates a sequence diagram showing an example of communications between the one or more databases, the server device, the computing device and the display device of FIG. 6.

Figure 6:
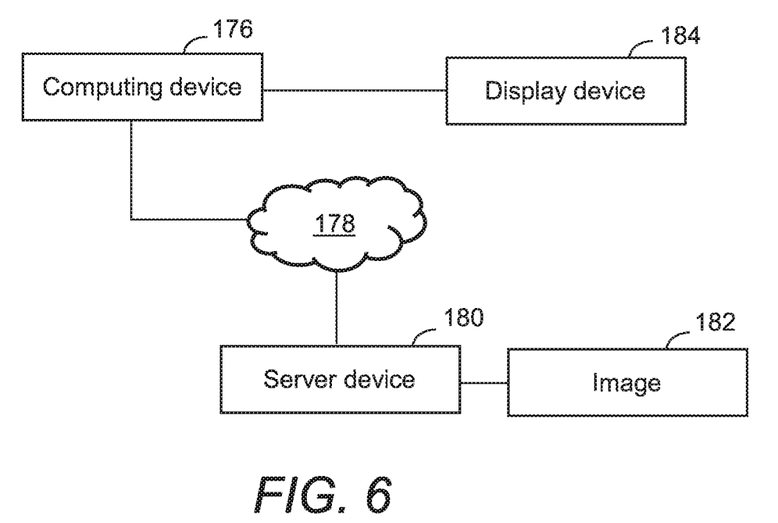
FIG. 6 is a schematic diagram showing an illustrative overview of an example system for use with a method of encoding image data or decoding encoded image data.
Figure 7:
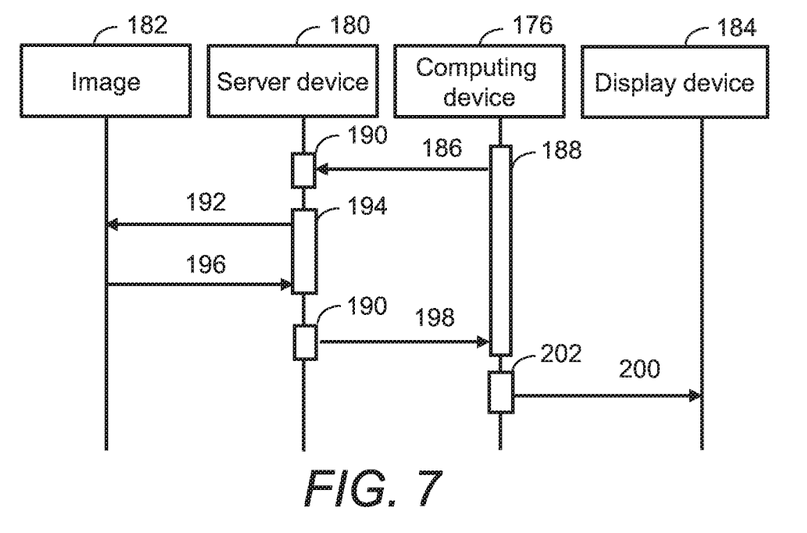
FIG. 7 is a sequence diagram showing an example of communications between the one or more databases, the server device, the computing device and the display device of FIG. 6.

FIG. 6 shows a computing device 176 communicatively coupled to a server device 180 over a network 174. An image 182 is stored on the server device 180. The computing device 1176 is communicatively coupled to a display device 184. The network 178 may include a series of networks such as the Internet.

The computing device 176 may be or include, amongst others, a cell phone, i.e. a mobile phone, for example a smartphone, a tablet, laptop or personal computer, a personal digital assistant, as well as various other electronic devices such as a game console. The components of an example computing device 176 are described in detail below with reference to FIG. 8. The computing device 176 may have integrated or externally-coupled wired and/or wireless local area network (LAN) capabilities, e.g. which may be coupled via an additional Universal Serial Bus (USB) or proprietary device. For example, the computing device 176 may be couplable to a wired and/or wireless router that is in turn connected to a Digital Subscriber Line (DSL), cable or fiber connection to a local exchange. The local exchange may be coupled to the so-called Internet using one or more intermediate networks, such as a Public Switched Telephone Network (PSTN) or a cable provider's network system. Alternatively, wireless telecommunications systems such as those using the Universal Mobile Telecommunications System (UMTS) or any of the Long-Term Evolution (LTE) standards may provide a communications medium for fixed or mobile computing devices. These latter network systems may in turn be connected to a series of one or more networks comprising servers, routers and other networking equipment that communicate using protocols such as Transmission Control Protocol (TCP) and Internet Protocol (IP). If the computing device 176 is a mobile device such as a smartphone, the computing device 176 may have an integrated telecommunications module for wirelessly communicating with a core network coupled to one or more TCP/IP networks; likewise, if the computing device 176 is a laptop or tablet computer it may have an externally-coupled telecommunications modem (a so-called "dongle", typically coupled via USB) for wireless communication with the core network and the wider Internet. The server device 180 may likewise have appropriate network communication components. The server device 180 may include an HTTP server that is arranged to receive requests over the network 178. In certain cases, one or more of the computing device 176 and the server device 180 may comprise virtual devices implemented on underlying physical computing hardware. The computing device 176 in examples may be considered to be a client device configured with access to the server device 180.

In an illustrative example of a possible use of the method according to examples, a user accesses a web page using a browser of the computing device 176. The web page is hosted on the server device 180 and includes various content including an image 182. The browser retrieves data relating to an image from the server device 180 via the network 178. For example, the server device 180 may be arranged to receive and handle HTTP or other network requests.

The data retrieved from the server device 180 in examples includes encoded difference data representing a difference between image data representing the image (prior to encoding) and reduced-noise decoded image data, as described above. For example, the encoded image data and the reduced-noise decoded image data may be stored in the same file, such as a JPEG XT file. In such an example, the encoded image data may correspond with base image layer data and the encoded difference data may correspond with extension image layer data, as described above.

The computing device 176 may be arranged to decode the data to generate output image data representing an output image, as described above with reference to FIG. 5. The output image, or a further output image based on an output of additional processing of the output image, may be displayed by the display device 184 coupled to the computing device 176. The display device 184 may be internally coupled to the computing device 176, with the display device 184 forming part of the computing device 176 itself. For example, the display device 184 may be a display screen of a computing device 176 such as a smartphone; tablet, laptop or desktop computer; or personal digital assistant. Alternatively, the display device 184 may be an external device coupled to the computing device 176, for example a television screen or a computer monitor coupled to a laptop, desktop computer or game console via a High-Definition Multimedia Interface (HDMI) cable.

FIG. 7 is a sequence diagram showing an example set of communications between the storage of the server device storing the image 182, the server device 180, the computing device 176 and the display device 184 of FIG. 6.

In operation 186, a browser of the computing device 176 requests a web page including an image 182 from the server device 178 via a network interface 188 of the computing device 176. The request is received by a network interface 190 of the server device 180. In operation 192 of the example communications of FIG. 7, a storage interface 194 of the server device 180 accesses, from storage of or coupled to the server device 180, the encoded image data and the encoded difference data. The web page, including the encoded image data and the encoded difference data, is transmitted from the storage to the storage interface 194 of the server device 180 in operation 196. The server device 180 then transmits the encoded image data and the encoded difference data from the network interface 190 of the server device 180 to the network interface 188 of the computing device 176 in block 198. A decoder module of the computing device 176, described further with reference to FIGS. 5 and 8, generates output image data based on the encoded image data and the encoded difference data. In block 200, the output image data is transferred by a display device interface 202 of the computing device 176 to the display device 184 to display an output image based on the output image data, as well as other content of the web page, to the user.

An overview of examples of internal components for the computing device 176 of FIGS. 6 and 7, is provided below with reference to FIG. 8.

Figure 8:
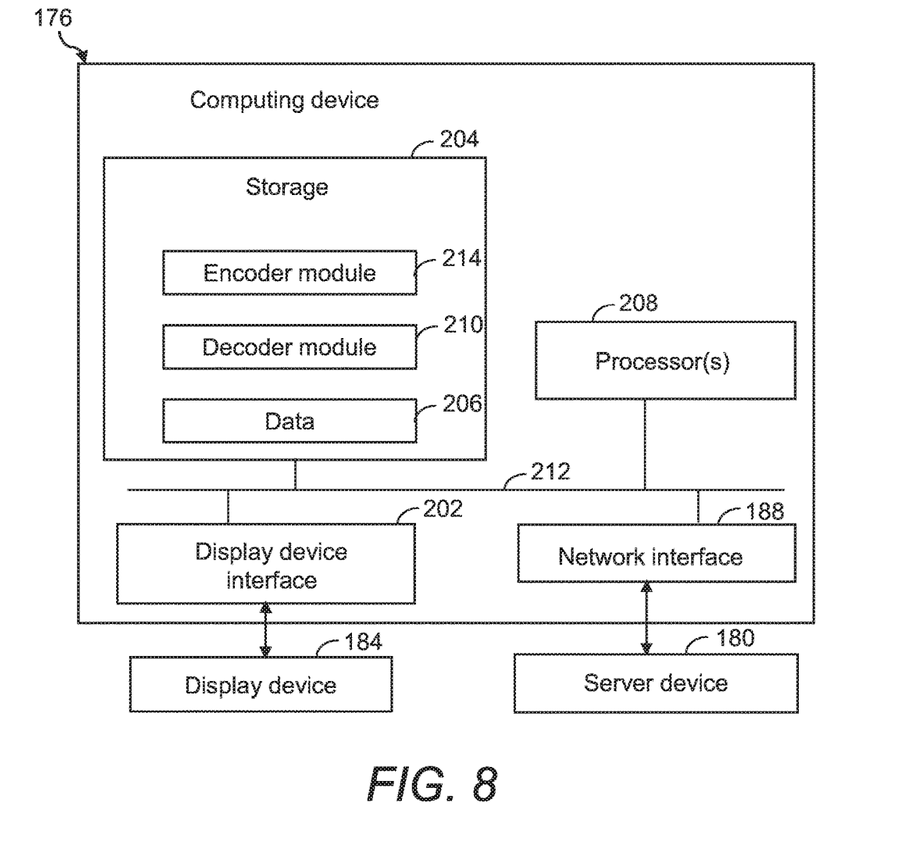
FIG. 8 is a schematic diagram showing an example of internal components of a computing device.

The computing device 176 of FIG. 8 comprises a network interface 188 to retrieve encoded image data and encoded difference data from the server device 180. The network interface 188 of the computing device 176 may include software and/or hardware components, such as a virtual network interface, an Ethernet port, a software driver and/or communications stack interacting with network hardware.

Storage 204 of the computing device 176 in the example of FIG. 8 stores data 206 received at the network interface 188. The data 206 in this example includes encoded image data and encoded difference data. The storage 204 may include at least one of volatile memory, such as a Random-Access Memory (RAM) and non-volatile memory, such as Read Only Memory (ROM) or a solid-state drive (SSD) such as Flash memory. The storage 204 in examples may comprise further storage devices, for example magnetic, optical or tape media, compact disc (CD), digital versatile disc (DVD) or other data storage media. The storage 204 may be removable or non-removable from the computing device 176.

At least one processor 208 is communicatively coupled to the storage 204 in the computing device 176 of FIG. 8. The at least one processor 208 in the example of FIG. 8 may be a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The at least one processor 208 may also be or include at least one graphics processing unit (GPU) such as an NVIDIA® GeForce GTX 980, available from NVIDIA®, 2701 San Tomas Expressway, Santa Clara, Calif. 95050, USA, although other processors are possible. For example, in one case the computing device may comprise a thin terminal with graphics processing capabilities; in other cases the computing device may comprise a computing device comprising at least one central processing unit (CPU) and at least one graphics processing unit.

The storage 204 in the example of FIG. 8 includes a decoder module 210 operable to decode the encoded image data to generate decoded image data, apply a compression-noise reduction operation to reduce a compression-noise component of the decoded image data to generate reduced-noise decoded image data, decode the encoded difference data to generate decoded difference data representing a difference between the image data and the reduced-noise decoded image data, and process the reduced-noise decoded image data and the decoded difference data to generate output image data representing the image. The decoder module 210 may implemented in hardware or software. For example, the decoder module 210 may be in the form of computer program instructions configured to, when processed by the at least one processor 208, implement the decoder module 210. The computer program instructions may be stored in an accessible non-transitory computer-readable medium and loaded into memory, for example the storage 204, to implement the decoder module 210. In examples, the storage 204 and the computer program instructions are configured to, with a graphics processing unit of the storage 204, implement the decoder module.

The components of the computing device 176 in the example of FIG. 8 are interconnected using a systems bus 212. This allows data to be transferred between the various components. For example, the output image data generated by the method according to examples can be stored in the storage 204 and subsequently transmitted via the systems bus 212 from the storage 204 to a display device interface 202 for transfer to the display device 184 for display. The display device interface 202 may include a display port and/or an internal electronics interface, e.g. where the display device 184 is part of the computing device 176 such as a display screen of a smartphone. Therefore, when instructed by the at least one processor 208 via the display device interface 202, the display device 184 will display an image based on the output image data.

In the example of FIG. 8, the storage 204 of the computing device 176 also includes an encoder module 214, which may be implemented in hardware or software, similarly to the decoder module 210. In examples such as FIG. 8 in which the storage 204 includes an encoder module 214, the decoded image data generated by the decoder module 206 may be considered to be second decoded image data and the reduced-noise decoded image data generated by the decoder module 206 may be considered to be second reduced-noise decoded image data. In these examples, the encoder module 214 may be configured to apply the lossy encoding operation to the image data to generate the encoded image data, decode the encoded image data to generate first decoded image data, apply the compression-noise reduction operation to the first decoded image data to generate first reduced-noise decoded image data, process the first reduced-noise decoded image data and the image data to generate the difference data, and encode the difference data to generate the encoded difference data. In this way, the computing device 176 may be operable to both encode and decode data representing an image, as needed. For example, the encoder module 214 may be similar to or the same as the encoder 100 of FIG. 1 and the decoder module 206 may be similar to or the same as the decoder 164 of FIG. 5.

The above examples are to be understood as illustrative examples. Further examples are envisaged. In the examples of FIGS. 1 and 5, the reducing the compression-noise component is performed by an encoder and a decoder, respectively. However, in further examples, other components or modules may be used to reduce the compression-noise component. The encoder and decoder of FIGS. 1 and 5 are merely illustrative and may include further components not shown. Furthermore, the methods implemented by the encoder and decoder of FIGS. 1 and 5, respectively, may be implemented by one or more modules other than an encoder and a decoder, respectively. Any suitable hardware or software may be used to implement these methods and the example implementations of FIGS. 1 and 5 are not intended to be limiting. Examples described herein relate to use of a JPEG XT codec, however in other examples the method and systems described herein may be used for a different codec.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of encoding image data representing an image, the method comprising:
   receiving the image data;
   applying a lossy encoding operation to the image data to generate encoded image data representing the image;
   decoding the encoded image data to generate decoded image data;
   reducing a compression-noise component of the decoded image data to generate reduced-noise decoded image data;
   processing the reduced-noise decoded image data and the image data to generate difference data representing a difference between the image data and the reduced-noise decoded image data;
   encoding the difference data to generate encoded difference data; and
   before encoding the difference data, scaling the difference data by increasing the magnitude of the difference data.

2. The method according to claim 1, wherein the encoding the difference data comprises applying the lossy encoding operation to the difference data.

3. The method according to claim 1, wherein the reducing the compression-noise component is performed by an encoder capable of encoding images.

4. The method according to claim 1, comprising reducing a dynamic range of the image data before the applying the lossy encoding operation to the image data.

5. The method according to claim 1, wherein the image data is in a more than 8-bit format.

6. The method according to claim 1, wherein at least one of the encoded image data or the difference data is in an 8-bit format.

7. The method according to claim 1, wherein the reducing the compression-noise component of the decoded image data comprises applying one of, or a combination of any two or more of:
   a smoothing filter to the decoded image data to reduce banding noise in the decoded image data,
   a bilateral filter to the decoded image data,
   an anisotropic filter to the decoded image data,
   a sliding window filter to the decoded image data, or
   an averaging filter to the decoded image data.

8. The method according to claim 1, wherein the reducing the compression-noise component of the decoded image data comprises applying a kernel to decoded image data representing a first portion of the image.

9. The method according to claim 8, wherein the first portion of the image is substantially free from edges in the image.

10. The method according to claim 8, wherein the lossy encoding operation comprises dividing the image represented by the image data into a plurality of blocks, and
   the first portion of the image comprises a boundary between neighboring blocks of the plurality of blocks of the image.

11. The method according to claim 8, wherein the kernel is a first kernel with a first size, the reducing the compression-noise component of the decoded image data further comprising applying a second kernel with a second size, different from the first size, to decoded image data representing a second portion of the image.

12. The method according to claim 11, wherein the second size is smaller than the first size and the second portion of the image is closer to an edge in the image than the first portion of the image.

13. The method according to claim 1, wherein said scaling the difference data before the encoding the difference data comprises scaling the difference data by a factor of four or a factor of eight.

14. A method of decoding encoded image data derived, using a lossy encoding operation, from image data representing an image, the method comprising:
   receiving the encoded image data;
   decoding the encoded image data to generate decoded image data;
   applying a compression-noise reduction operation to reduce a compression-noise component of the decoded image data to generate reduced-noise decoded image data;
   receiving encoded difference data;
   decoding the encoded difference data to generate decoded difference data representing a difference between the image data and the reduced-noise decoded image data;
   de-scaling the decoded difference data; and processing the reduced-noise decoded image data and the de-scaled decoded difference data to generate output image data representing the image.

15. The method according to claim 14, wherein the output image data is substantially the same as the image data.

16. The method according to claim 14, wherein the decoded image data has a first bit precision and the output image data has a second bit precision higher than the first bit precision.

17. The method according to claim 14, wherein the decoded image data represents a first dynamic range representation of the image and the output image data represents a second dynamic range representation of the image, the second dynamic range being larger than the first dynamic range.

18. The method according to claim 14, wherein the method is performed by a decoder capable of decoding images.

19. A computing device comprising:
    storage for storing:
        encoded image data derived, using a lossy encoding operation, from image data representing an image; and
        encoded difference data;
    at least one processor communicatively coupled to the storage; and
    a decoder module operable to:
        decode the encoded image data to generate decoded image data;
        apply a compression-noise reduction operation to reduce a compression-noise component of the decoded image data to generate reduced-noise decoded image data;
        decode the encoded difference data to generate decoded difference data representing a difference between the image data and the reduced-noise decoded image data;
        de-scale the decoded difference data; and
        process the reduced-noise decoded image data and the de-scaled decoded difference data to generate output image data representing the image.

20. The computing device according to claim 19, wherein the decoded image data is second decoded image data and the reduced-noise decoded image data is second reduced-noise decoded image data, the computing device comprising an encoder module configured to:
    apply the lossy encoding operation to the image data to generate the encoded image data;
    decode the encoded image data to generate first decoded image data;
    apply the compression-noise operation to reduce the compression-noise component of the first decoded image data to generate first reduced-noise decoded image data;
    process the first reduced-noise decoded image data and the image data to generate the difference data; and
    encode the difference data to generate the encoded difference data.

\* \* \* \* \*